United States Patent
Sol

(10) Patent No.: US 9,577,720 B2
(45) Date of Patent: Feb. 21, 2017

(54) IN-VEHICLE APPARATUS FOR COMMUNICATING WITH WEARABLE DEVICE AND CONTROL METHOD THEREOF

(71) Applicant: HYUNDAI MOTOR COMPANY, Seoul (KR)

(72) Inventor: Un Hwan Sol, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/919,484

(22) Filed: Oct. 21, 2015

(65) Prior Publication Data
US 2016/0204837 A1    Jul. 14, 2016

(30) Foreign Application Priority Data
Jan. 13, 2015  (KR) .................. 10-2015-0005963

(51) Int. Cl.
| | | |
|---|---|---|
| *H04B 7/00* | (2006.01) | |
| *H04B 5/06* | (2006.01) | |
| *G10L 15/30* | (2013.01) | |
| *H04B 5/00* | (2006.01) | |
| *H04W 4/00* | (2009.01) | |
| *H04W 4/10* | (2009.01) | |
| *H04B 1/00* | (2006.01) | |

(52) U.S. Cl.
CPC ............. *H04B 5/06* (2013.01); *G10L 15/30* (2013.01); *H04B 5/0006* (2013.01); *H04B 5/0031* (2013.01); *H04W 4/008* (2013.01); *H04W 4/10* (2013.01)

(58) Field of Classification Search
CPC   H04M 1/6033; H04M 1/6041; H04M 1/6075; H04M 1/7253

USPC .............. 455/41.2–41.3, 569.1–569.2
See application file for complete search history.

(56) References Cited

U.S. PATENT DOCUMENTS

| | | | |
|---|---|---|---|
| 7,577,459 B2 * | 8/2009 | Tuomela .............. | H04B 13/005 455/41.1 |
| 2014/0222526 A1 * | 8/2014 | Shakil ................... | G06Q 50/22 705/7.38 |
| 2014/0357248 A1 * | 12/2014 | Tonshal .............. | H04M 1/6091 455/418 |

FOREIGN PATENT DOCUMENTS

| | | |
|---|---|---|
| KR | 10-2009-0022625 A | 3/2009 |
| KR | 10-2011-0121322 A | 11/2011 |
| KR | 10-2011-0131247 A | 12/2011 |
| KR | 10-2011-0135562 A | 12/2011 |

(Continued)

OTHER PUBLICATIONS

Korean Office Action issued in Korean Application No. 10-2015-0005963 dated Mar. 10, 2016.

*Primary Examiner* — Lee Nguyen
(74) *Attorney, Agent, or Firm* — McDermott Will & Emery LLP

(57) ABSTRACT

A control method in an in-vehicle apparatus capable of communicating with a wearable device and performing voice recognition, includes pairing with the wearable device via near field wireless communication, outputting a message to inquire whether to commence a voice recognition service using the paired wearable device, transmitting a request signal to open a channel for audio data to the wearable device, receiving audio data from the wearable device, executing a predetermined function corresponding to recognized voice based on the audio data, and transmitting a request signal to close the channel for the audio data to the wearable device.

15 Claims, 6 Drawing Sheets

(56) References Cited

FOREIGN PATENT DOCUMENTS

| | | |
|---|---|---|
| KR | 10-2012-0025842 A | 3/2012 |
| KR | 10-2012-0116531 A | 10/2012 |

* cited by examiner

IN-VEHICLE APPARATUS FOR COMMUNICATING WITH WEARABLE DEVICE AND CONTROL METHOD THEREOF

CROSS-REFERENCE TO RELATED APPLICATION

This application claims priority to and the benefit of Korean Patent Application No. 10-2015-0005963, filed on Jan. 13, 2015 in the Korean Intellectual Property Office, the disclosure of which is hereby incorporated by reference as if fully set forth herein.

TECHNICAL FIELD

The present disclosure relates to a wearable device and an in-vehicle apparatus, and more particularly, to a wearable device having a microphone and an in-vehicle apparatus controlled by the microphone of the wearable device.

BACKGROUND

Usage of in-vehicle multimedia systems is increasing and functions of in-vehicle multimedia systems are becoming complex according to needs of users. In recent years, vehicles including voice recognition functions have begun to be introduced. Accuracy of voice recognition varies according to a voice recognition algorithm as well as the performance of a microphone. Microphones of conventional voice recognition systems are located at, for example, a head lining or an overhead-console inside a vehicle, which causes low voice recognition accuracy. In addition, addition of a voice recognition system and a microphone to a vehicle is considerably expensive.

SUMMARY

Accordingly, the present invention is directed to an in-vehicle apparatus for communicating with a wearable device and a control method thereof that substantially obviate one or more problems due to limitations and disadvantages of the related art.

One object of the present invention is to improve the rate of recognition of an in-vehicle voice recognition system using a microphone of a wearable device.

Another object of the present invention is to provide technology to enable audio channel connection between a wearable device and an in-vehicle system using an existing profile without an additional new Bluetooth profile.

A further object of the present invention is to provide a solution in which an audio channel between a wearable device and an in-vehicle system is simply switched on or off as needed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method in an in-vehicle apparatus, the in-vehicle apparatus being capable of communicating with a wearable device and performing voice recognition, includes pairing with the wearable device via near field wireless communication, outputting a message to inquire whether to commence a voice recognition service using the paired wearable device, transmitting a request signal to open a channel for audio data to the wearable device, receiving audio data from the wearable device, executing a predetermined function corresponding to recognized voice based on the audio data, and transmitting a request signal to close the channel for the audio data to the wearable device.

In accordance with another aspect of the present invention, an apparatus capable of communicating with a wearable device and performing voice recognition, includes a wireless communication unit configured to be paired with the wearable device via near field wireless communication, a display unit configured to output a message to inquire whether to commence a voice recognition service using the paired wearable device, and a controller configured to control the wireless communication unit to transmit a request signal to open a channel for audio data to the wearable device.

In accordance with another aspect of the present invention, a control method in a wearable device includes pairing with an in-vehicle apparatus via wireless communication, receiving a request signal to open a channel for audio data from the in-vehicle apparatus, transmitting audio data to the in-vehicle apparatus, and receiving a request signal to close the channel for the audio data to the in-vehicle apparatus.

In accordance with a further aspect of the present invention, a wearable device includes a display module configured to output predetermined video data, a wireless communication module configured to be paired with an in-vehicle apparatus, and a controller configured to control the display module and the wireless communication module. The controller controls the wireless communication module so as to receive a request signal to open a channel for audio data from the in-vehicle apparatus, to transmit audio data to the in-vehicle apparatus, and to receive a request signal to close the channel for the audio data to the in-vehicle apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
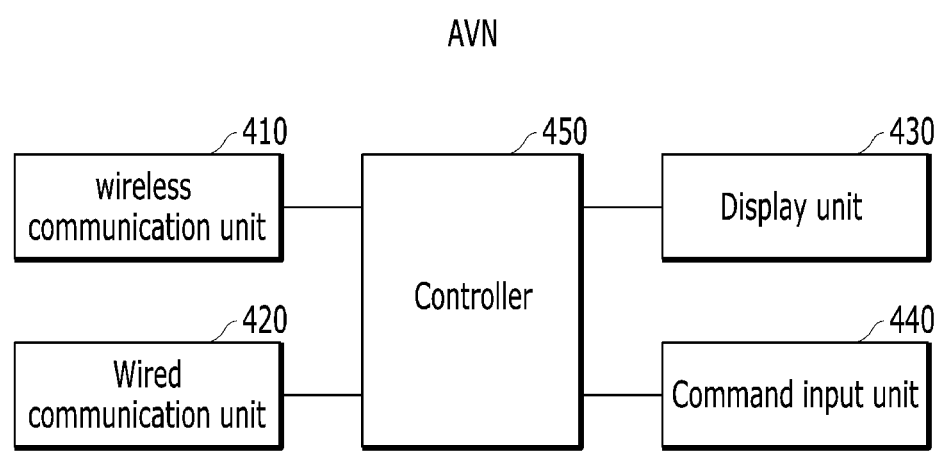
FIG. 1 is a block diagram illustrating an exemplary configuration of an AVN system according to an embodiment of the present invention.

Hereinafter, reference will now be made in detail to the preferred embodiments of the present invention, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description and thus can be used interchangeably and do not have any distinguishable meanings or functions.

In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions included in the sprit and scope of the present invention.

In an embodiment of the present invention, in a case in which a vehicle passenger (or a driver) wears a wearable device (for example, smart glasses, glasses), a microphone of the wearable device is used to provide an improved voice recognition function. Moreover, in another embodiment of the present invention, there is defined a concrete solution for using a microphone of a wearable device as a microphone for a voice recognition module of an in-vehicle system. In addition, in a further embodiment of the present invention, connection between a wearable device and an in-vehicle system is possible using a current profile without an additional device and an additional new Bluetooth profile (new standard) and, in order to solve unnecessary connection of a hands-free profile, channel ON/OFF is implemented using push to talk (PTT). In particular, for example, handover of a voice recognition channel may be accomplished using a Bluetooth hands-free profile without addition of a new device.

Hereinafter, the embodiments of the present invention will be described in more detail with reference to FIGS. 1 to 6.

FIG. 1 is a block diagram illustrating an exemplary configuration of an audio video navigation (AVN) system according to an embodiment of the present invention. An in-vehicle apparatus as described in this specification may be designed to communicate with a wearable device and, for example, an AVN system may be used as the in-vehicle apparatus. Of course, other apparatuses may be used instead of the AVN system within the scope of the present invention.

As exemplarily illustrated in FIG. 1, the AVN system of a vehicle may include a wireless communication unit 410 connected to a wearable device (for example, smart glasses) to exchange various control signals and safety-related information via wireless communication protocols such as, for example, Bluetooth or Wi-Fi, a wired communication unit 420 to exchange signals with other controllers of the vehicle that acquire safety-related information (for example, a smart cruise controller, a blind spot sensing controller, a lateral rear side distance sensor controller, and an around view system controller), a display unit 430 to display a list or execution screen of various functions, a command input unit 440 to receive a command from a driver such as, for example, a touchpad or key buttons, and a controller 450 to control the aforementioned components, the controller 450 performing judgment and calculation required for implementation of the present embodiment.

For example, when the smart glasses request safety-related information, the controller 450 may control the wired communication unit 420 to collect safety-related information from the associated controllers and transmit the collected information to the smart glasses via the wireless communication unit 410.

Of course, it will be clearly understood by those skilled in the art that the configuration of FIG. 1 is given by way of example and may include a different number of components as needed. For example, the wireless communication unit may be incorporated in a controller outside of the AVN system, and a sound output unit to output a multimedia or navigation guide voice or a warning sound may further be provided.

Next, a wearable device capable of communicating with the above-described AVN system will be described with reference to FIG. 2.

Figure 2:
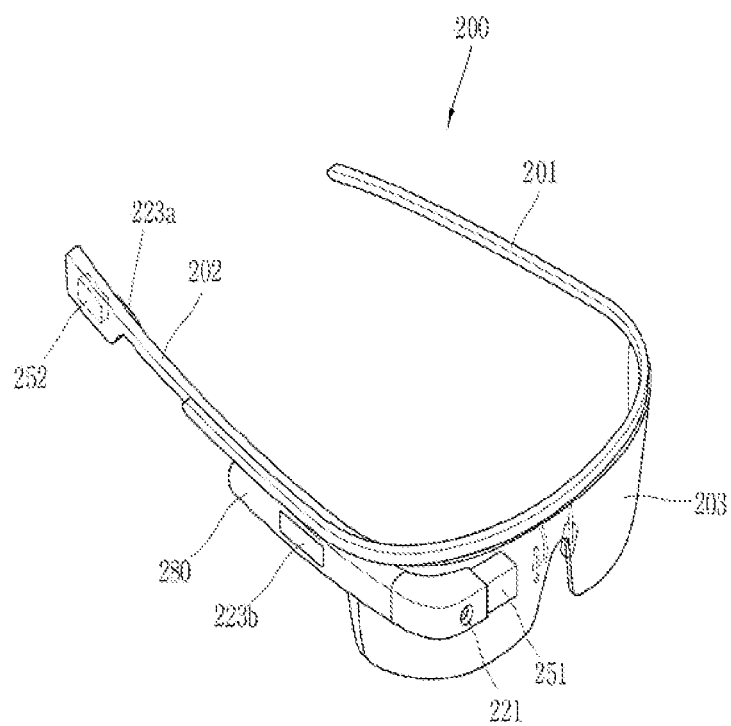
FIG. 2 is a view illustrating an example of a wearable device applicable to embodiments of the present invention.

Although FIG. 2 illustrates smart glasses as one example of a wearable device applicable to the embodiments of the present invention, the present invention should not be limited to the smart glasses. That is, a wearable device such as, for example, a smart watch may be applied to the embodiments of the present invention.

The smart glasses 200 are configured to be worn on the human head. To this end, the smart glasses 200 may include a frame unit (e.g., a case or housing). The frame unit may be formed of a flexible material for easy wearing. FIG. 2 illustrates the frame unit as including a first frame 201 and a second frame 202 formed of different materials.

The frame unit is supported by the head and internally defines a space for installation of various components. As illustrated in FIG. 2, electronic components such as, for example, a control module 280 and a sound output module 252 may be mounted to the frame unit. In addition, a lens 203 to cover at least one of the left eye and the right eye may be separably coupled to the frame unit.

The control module 280 is configured to control a variety of electronic components mounted to the smart glasses 200. For example, the control module 280 may allow establishment of a wireless data path with the AVN system of the vehicle through a wireless communication unit (not shown) of the smart glasses 200, and request and receive safety-related information of the vehicle through the established data path. In addition, the control module 280 may allow the received safety-related information to be displayed on the display unit 251, and determine a gaze direction of the driver using at least one of images captured by a camera oriented to face the eye of the driver and a front camera 221. In addition, the control module 280 may judge, based on the determined gaze direction or a direction sensed by a gyro sensor (not illustrated), whether the driver does not remain focused on the road.

Although FIG. 2 illustrates the control module 280 as being installed to one side of the frame unit around the head, the position of the control module 280 is not limited thereto.

The display unit 251 may take the form of a head mounted display (HMD). The HMD is a display that is worn on the head of a user to display an image immediately in front of the user's eyes. To provide an image immediately in front of the user's eyes when the user wears the smart glasses 200, the display unit 251 may be located to correspond to at least one of the left eye and the right eye. FIG. 2 illustrates the display unit 251 as being located to correspond to the right eye so as to output an image toward the right eye of the user.

The display unit 251 may project an image to the user's eye using a prism. In addition, the prism may be a transparent to allow the user to view both the projected image and a general forward visual range (i.e. a viewing range through the user's eyes).

As described above, the image output through the display unit 251 may overlap a general driver's field of vision. The smart glasses 200 may help in selection of a function by the driver without preventing the driver from remaining focused on the road during traveling through the use of this characteristic of the display unit 251.

The camera 221 is located proximate to at least one of the left eye and the right eye to capture a forward image. The camera 221 located proximate to the eye may acquire an image of a scene that the user views.

Although FIG. 2 illustrates the camera 221 as being incorporated in the control module 280, the position of the camera 221 is not limited thereto. The camera 221 may be installed to the frame unit and a plurality of cameras may be used to acquire a stereoscopic image. In addition, the camera (not illustrated) oriented to face the user's eye may be installed opposite to the forwardly oriented camera 221. The camera oriented to face the user's eye is adapted to acquire an image for determining a gaze direction of the driver by tracking the user's pupil.

The smart glasses 200 may include command input units 223a and 223b operated to receive a control command. The command input units 223a and 223b may be operated by touch or push action, for example.

Figure 3:
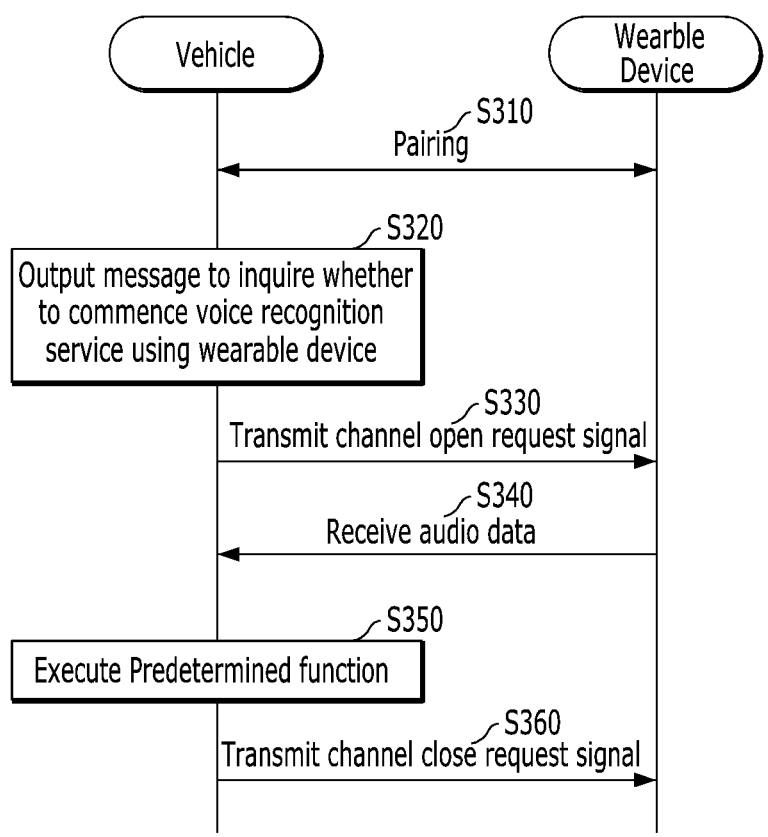
FIG. 3 is a schematic flowchart illustrating communication connection between a vehicle and a wearable device according to an embodiment of the present invention.

FIG. 3 is a schematic flowchart illustrating communication connection between a vehicle and a wearable device according to an embodiment of the present invention.

The vehicle as exemplarily illustrated in FIG. 3 corresponds to, for example, an audio video navigation (AVN) system.

The vehicle, i.e. the AVN system, is paired with the wearable device via near field wireless communication (S310), and outputs a message to inquire whether to commence a voice recognition service using the paired wearable device (S320). The wearable device corresponds to, for example, smart glasses illustrated in FIG. 2.

Then, if the AVN receives an instruction from the user to commence a voice recognition service using the paired wearable device, the AVN system transmits a request signal to open a channel for audio data to the wearable device (S330), and receives audio data from the wearable device (S340).

The vehicle executes a predetermined function corresponding to recognized voice based on the audio data (S350), and transmits a request signal to close the channel for the audio data to the wearable device (S360).

The above step S320 is performed via at least one of a speaker and a display module and designed to output the message only in a case in which a specific string is included in an ID of the paired wearable device. The specific string corresponds to, for example, "glass" stored in a memory of the AVN system. This will be described below in more detail with reference to FIG. 4.

In addition, the channel for reception of the audio data is, for example, opened only in a first direction for transmission of audio data from the wearable device to the AVN system and closed in a second direction for transmission of audio data from the AVN system to the wearable device. This will be described below in more detail with reference to FIG. 4.

The near field wireless communication corresponds to, for example, Bluetooth.

The above step S330 is designed to be restrictively executed after user selection is performed via a predetermined button or touch interface for push to talk (PTT). This will be described below in more detail with reference to FIG. 4.

A description will be given of an apparatus (for example, the AVN system) capable of communicating with the wearable device and performing voice recognition with reference to FIGS. 1 and 3.

The wireless communication unit 410 is designed to achieve pairing with the wearable device via near field wireless communication, and the display unit 430 outputs a message to inquire whether to commence a voice recognition service using the paired wearable device.

The controller 450 controls the wireless communication unit 410 to transmit a request signal to open a channel for audio data to the wearable device.

The controller 450 controls the wireless communication unit 410 to receive audio data from the wearable device, to execute a predetermined function corresponding to recognized voice based on the audio data, and to transmit a request signal to close the channel for the audio data to the wearable device.

The display unit 430 is designed to output the message only in a case in which a specific string is included in an ID of the paired wearable device. The specific string corresponds to, for example, "glass" stored in a memory of the apparatus.

Figure 4:
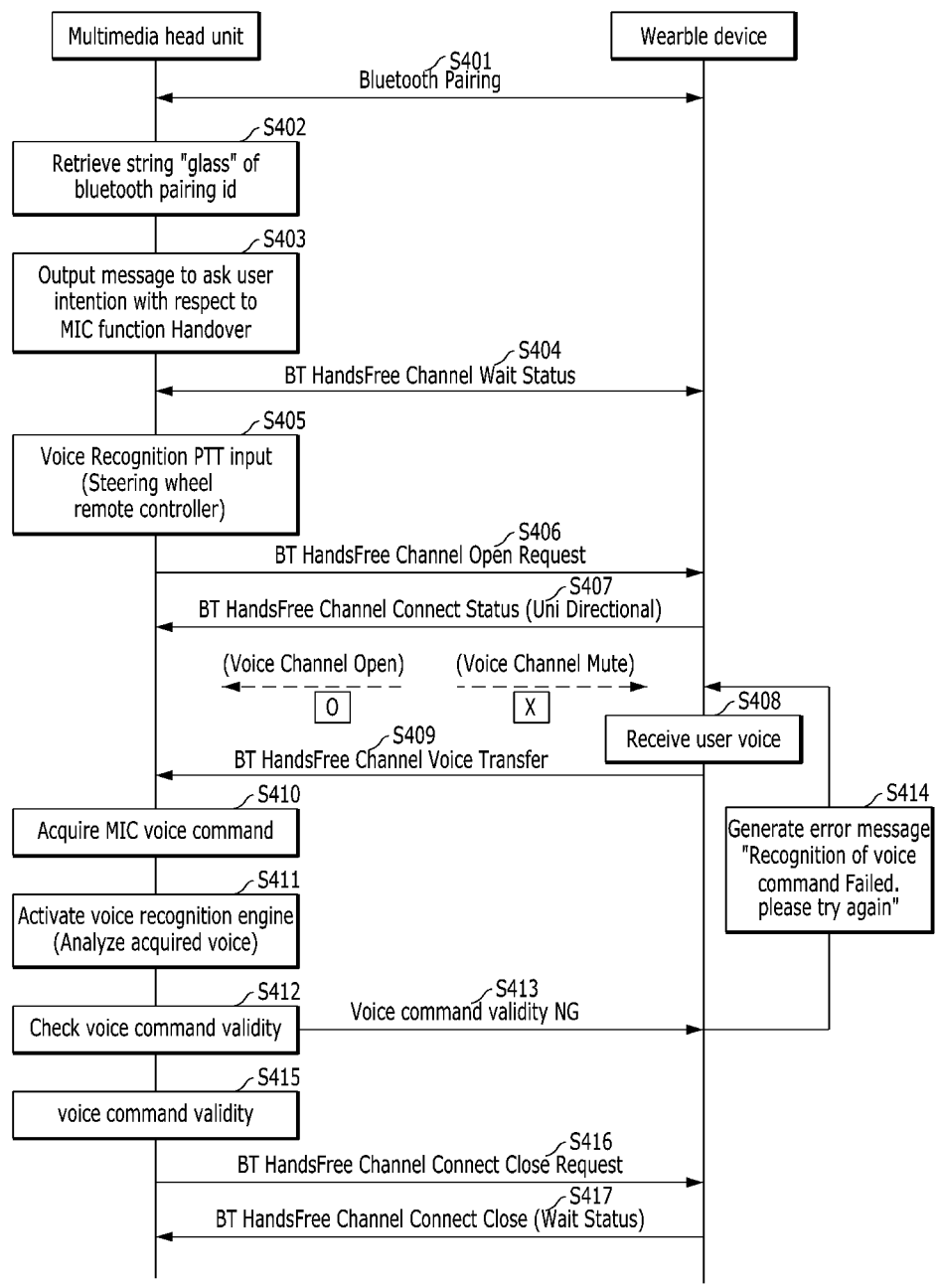
FIG. 4 is a detailed flowchart illustrating communication connection between the vehicle and the wearable device according to an embodiment of the present invention.

FIG. 4 is a detailed flowchart illustrating communication connection between the vehicle and the wearable device according to an embodiment of the present invention.

A multimedia head unit as illustrated in FIG. 4 refers to a system mounted in a vehicle and corresponds to, for example, the above-described AVN system of FIG. 1. The multimedia head unit is designed to enable voice recognition and advantageously does not require addition of a microphone according to the present invention.

The multimedia head unit and the wearable device are Bluetooth paired as one example of wireless communication (S401). Then, the multimedia head unit mounted in the vehicle retrieves a string of a Bluetooth pairing ID (S402). For example, when the string does not include characters such as, for example, "wearable", "glass", and "watch", the multimedia head unit maintains general pairing with the wearable device. On the other hand, when the above-mentioned characters are included in the string or coincide with the wearable device, the multimedia head unit outputs a message to ask user intention with respect to microphone function handover (S403). The microphone function handover means that a microphone of an in-vehicle voice recognition device is replaced with a microphone of the wearable device. In addition, the multimedia head unit and the wearable device are changed to a state to wait a Bluetooth (BT) hands-free (HF) channel (S404). The above-described steps S401 to S404 may be a ready or wait state for recognition of the wearable device and voice recognition microphone handover.

Then, the multimedia head unit receives a push to talk (PTT) input for voice recognition (S405). Any button inside the vehicle or a touch display unit may be used for the PTT input. Upon selection of the button for the PTT input, the multimedia head unit transmits a request signal to open a BT HF channel to the wearable device (S406). Then, the wearable device and the multimedia head unit are changed into a BT HF channel connect state (S407). At this time, one feature of the present invention is that the channel in the above step S407 is designed as a unidirectional channel. Only a voice channel in a direction from the wearable device to the multimedia head unit is open and a voice channel in an opposite direction is set to a MUTE state, which has the effect of previously preventing use of unnecessary audio data. When the wearable device receives user voice (S408), the corresponding audio data is transmitted to the multimedia head unit (S409). The above steps S405 to S408 are steps for voice recognition microphone handover and acquisition and transmission of user voice. That is, these steps S405 to S408 may be referred to as steps with regard to activation of an audio channel.

When the multimedia head unit receives the audio data (voice) from the microphone of the wearable device (S410), the multimedia head unit activates a voice recognition engine and analyzes the acquired voice (S411). The multimedia head unit judges validity of a voice command of the corresponding audio data (S412). Upon failure of voice recognition, the multimedia head unit transmits data to notify that the voice command is invalid to the wearable device (S413). Thereby, the wearable device outputs a video or audio type error message (S414). On the other hand, when a result of the judgment (S412) is that the voice command is valid (S415), the multimedia head unit executes a function corresponding to the voice command. The above steps S410 to S415 are steps for user voice command analysis and validity judgment.

Finally, another feature of the present invention is that the multimedia head unit transmits a request signal to close the BT HF channel to the wearable device (S416) and the BT HF channel is immediately changed into a close state, i.e. wait state (S417). That is, the above steps S416 and S417 are steps for stopping the voice recognition microphone handover. Accordingly, from this time, the wearable device performs near field communication or Bluetooth communication with other devices and is reconnected as needed to the multimedia head unit only in a case in which step S405 (button input for PTT) is present.

According to a further embodiment of the present invention, to transmit the message of step S414, a voice channel from the multimedia head unit to the wearable device is designed to be temporarily opened. Then, after transmission of the message, the voice channel is again closed, which has a technical effect of preventing unnecessary data communication.

Figure 5:
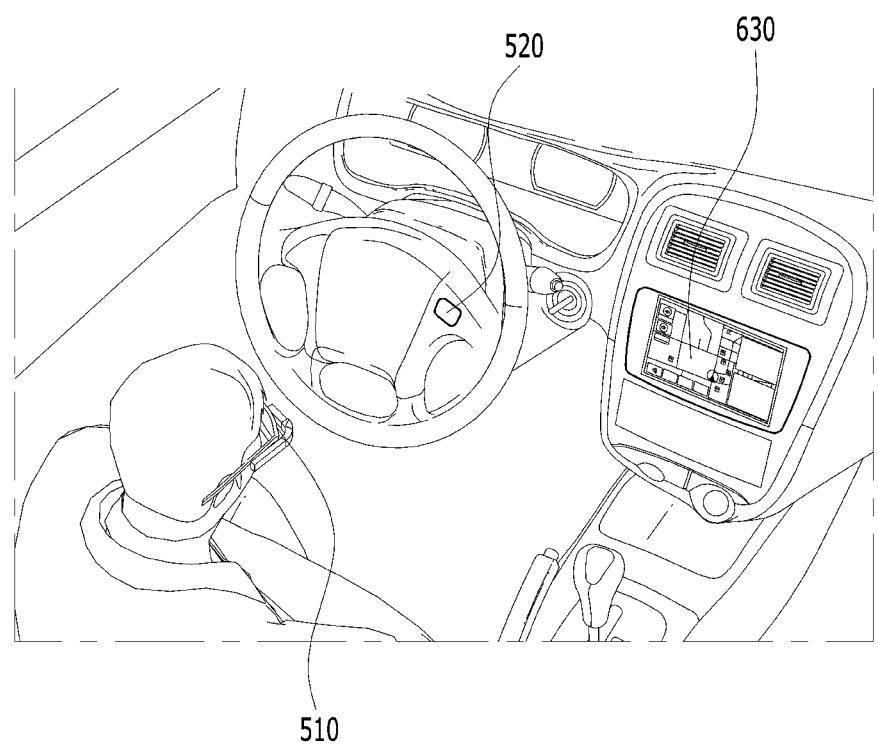
FIGS. 5 and 6 are views assuming a case in which a driver who possesses a wearable device gets in a vehicle according to an embodiment of the present invention.
Figure 6:
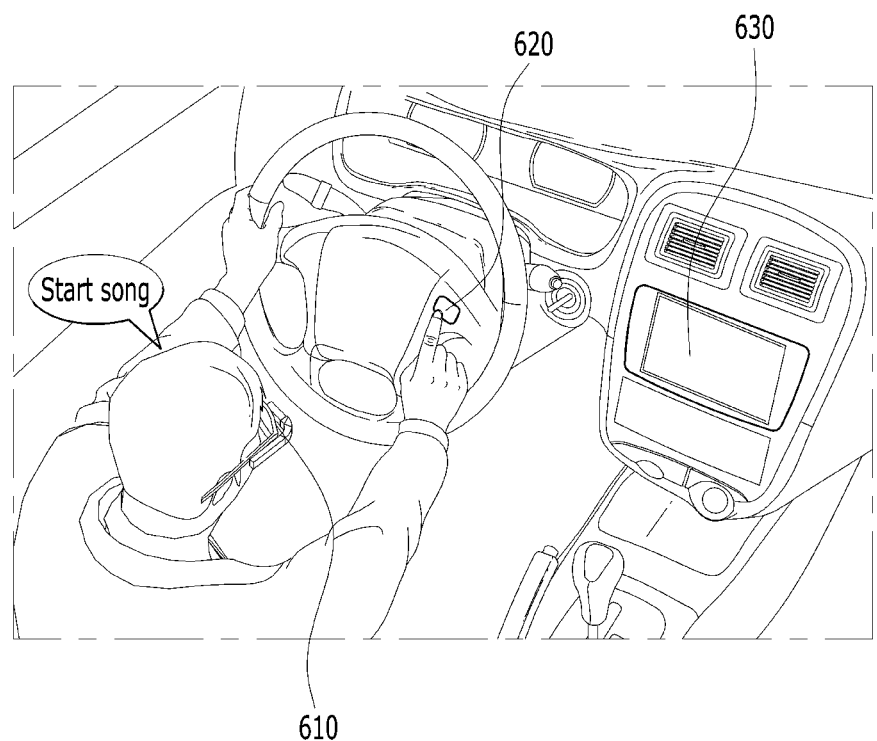

FIGS. 5 and 6 are views assuming a case in which a driver who possesses a wearable device gets in a vehicle according to an embodiment of the present invention.

A wearable device 510 as exemplarily illustrated in FIG. 5 and an in-vehicle AVN system 530 have sufficiently been described with reference to FIGS. 1 to 4 and supplementary analysis thereof is possible by those skilled in the art with reference to the above description. In addition, a specific button 520 illustrated in FIG. 5 is used for PTT and may be an existing button or new button, or a touch interface inside the vehicle.

As exemplarily illustrated in FIG. 6, when the driver who possesses a wearable device 610 pushes a specific button 620 for PTT, handover to a microphone of the wearable device 610 is performed. That is, audio data received through the microphone of the wearable device 610 is transmitted to an in-vehicle apparatus 630, for example, the AVN system. Accordingly, at this time, it is unnecessary to install a microphone in the vehicle and assuming that a microphone is incorporated in the vehicle, the microphone may be turned off to reduce power consumption. In addition, as exemplarily illustrated in FIG. 6, when the driver issues a voice command "Start Song", an in-vehicle voice recognition algorithm analyzes voice based on this audio data and the AVN system 630 displays an execution screen of the corresponding command.

That is, in an embodiment of the present invention, the kind of a wearable device is first judged via string analysis of a pairing ID using a Bluetooth function, i.e. "hands-free profile" that is applied to an in-vehicle multimedia system and a commercialized wearable device and, thereafter, user intention with respect to microphone function handover is judged. Thereafter, a hands-free channel for unidirectional sound output is configured only in response to a PTT input and the in-vehicle system may acquire a user voice command from the wearable device through the configured channel.

In this way, since a desired function may be implemented through a currently applied Bluetooth function and a logic configuration of a profile, this function implementation may be accomplished via minimum S/W change with substantially no increase in material costs and without requiring an additional standard (e.g., a Bluetooth profile).

In addition, upon configuration of a hands-free channel, as a result of using a unidirectional channel other than a bidirectional channel (i.e. switching off output from the in-vehicle system to the wearable device), S/W correction for prevention of unnecessary sound output from a sound output device of the wearable device is unnecessary. In addition, for a phone call function of a hands-free profile, the hands-free channel may be returned to a wait mode immediately after recognition of a voice command, which enables function implementation while minimizing the effect of an original hands-free function.

As is apparent from the above description, the embodiments of the present invention provide the following advantages as compared to the related art.

First, according to an embodiment of the present invention, the rate of recognition of an in-vehicle voice recognition system may be improved through use of a microphone of a wearable device.

According to another embodiment of the present invention, there is provided technology to enable audio channel connection between a wearable device and an in-vehicle system using an existing profile without an additional new Bluetooth profile.

In addition, according to a further embodiment of the present invention, there is provided a solution in which an audio channel between a wearable device and an in-vehicle system is simply switched on or off as needed.

It will be appreciated by persons skilled in the art that the effects that can be achieved through the present invention are not limited to what has been particularly described hereinabove and other advantages of the present invention will be more clearly understood from the above detailed description.

The present invention as described above may be implemented as a computer readable code of a computer readable medium in which programs are recorded. The computer readable medium includes all kinds of recording devices in which data that may be read by a computer system is stored. Examples of the computer readable medium may include a hard disk drive (HDD), a solid state disk (SSD), a silicon disk drive (SDD), ROM, a RAM, a CD-ROM, a magnetic tape, a floppy disk, and an optical data storage device. In addition, the computer readable recording medium includes a carrier wave (e.g., data transmission over the Internet).

Accordingly, the above detailed description is not intended to be construed to limit the present invention in all aspects and be considered by way of example. The scope of the present invention should be determined by reasonable interpretation of the accompanying claims and all equivalent modifications made without departing from the present invention should be included in the following claims.

What is claimed is:

1. A control method in an in-vehicle apparatus, the in-vehicle apparatus being capable of communicating with a wearable device and performing voice recognition, the control method comprising:
    pairing with the wearable device via near field wireless communication;
    outputting a message to inquire whether to commence a voice recognition service using the paired wearable device;
    transmitting a request signal to open a channel for audio data to the wearable device;
    receiving audio data from the wearable device;
    executing a predetermined function corresponding to recognized voice based on the audio data; and
    transmitting a request signal to close the channel for the audio data to the wearable device,
    wherein the channel for reception of the audio data is opened only in a first direction and closed in a second direction, the first direction being a direction for transmission of audio data from the wearable device to the in-vehicle apparatus and the second direction being a direction for transmission of audio data from the in-vehicle apparatus to the wearable device.

2. The control method according to claim 1, wherein the in-vehicle apparatus corresponds to an audio video navigation (AVN) system.

3. The control method according to claim 1, wherein the outputting is performed via at least one of a speaker and a display module of the in-vehicle apparatus, and the message is only outputted when a predetermined string is included in an ID of the paired wearable device.

4. The control method according to claim 3, wherein the predetermined string corresponds to "glass" stored in a memory of the in-vehicle apparatus.

5. The control method according to claim 1, wherein the near field wireless communication is Bluetooth communication.

6. The control method according to claim 1, wherein the transmitting the request signal to open the channel for the audio data is restrictively executed after user selection is performed via a predetermined button or touch interface for push to talk (PTT).

7. An apparatus capable of communicating with a wearable device and performing voice recognition, the apparatus comprising:
    a wireless communication unit configured to be paired with the wearable device via near field wireless communication;
    a display unit configured to output a message to inquire whether to commence a voice recognition service using the paired wearable device; and
    a controller configured to control the wireless communication unit to transmit a request signal to open a channel for audio data to the wearable device,
    wherein the channel for reception of the audio data is opened only in a first direction and closed in a second direction, the first direction being a direction for transmission of audio data from the wearable device to the apparatus and the second direction being a direction for transmission of audio data from the apparatus to the wearable device.

8. The apparatus according to claim 7, wherein the controller controls the wireless communication unit so as to:
    receive audio data from the wearable device;
    execute a predetermined function corresponding to recognized voice based on the audio data; and
    transmit a request signal to close the channel for the audio data to the wearable device.

9. The apparatus according to claim 8, wherein the apparatus is installed in a vehicle.

10. The apparatus according to claim 8, wherein the controller controls the wireless communication unit so as to transmit the request signal to open the channel for the audio data to the wearable device after user selection is performed via a predetermined button or touch interface for push to talk (PTT).

11. The apparatus according to claim 7, wherein the display unit outputs the message only when a predetermined string is included in an ID of the paired wearable device.

12. The apparatus according to claim 11, wherein the predetermined string corresponds to "glass" stored in a memory of the apparatus.

13. The apparatus according to claim 7, wherein the near field wireless communication is Bluetooth communication.

14. A control method in a wearable device, the control method comprising:
    pairing with an in-vehicle apparatus via wireless communication;
    receiving a request signal to open a channel for audio data from the in-vehicle apparatus;
    transmitting audio data to the in-vehicle apparatus; and
    receiving a request signal to close the channel for the audio data to the in-vehicle apparatus;
    wherein the channel for reception of the audio data is opened only in a first direction and closed in a second direction, the first direction being a direction for transmission of audio data from the wearable device to the in-vehicle apparatus and the second direction being a direction for transmission of audio data from the in-vehicle apparatus to the wearable device.

15. A wearable device comprising:
    a display module configured to output predetermined video data;
    a wireless communication module configured to be paired with an in-vehicle apparatus; and
    a controller configured to control the display module and the wireless communication module,
    wherein the controller controls the wireless communication module so as to:
    receive a request signal to open a channel for audio data from the in-vehicle apparatus;
    transmit audio data to the in-vehicle apparatus; and
    receive a request signal to close the channel for the audio data to the in-vehicle apparatus,
    wherein the channel for reception of the audio data is opened only in a first direction and closed in a second direction, the first direction being a direction for transmission of audio data from the wearable device to the in-vehicle apparatus and the second direction being a direction for transmission of audio data from the in-vehicle apparatus to the wearable device.

* * * * *